United States Patent Office 3,264,643
Patented August 2, 1966

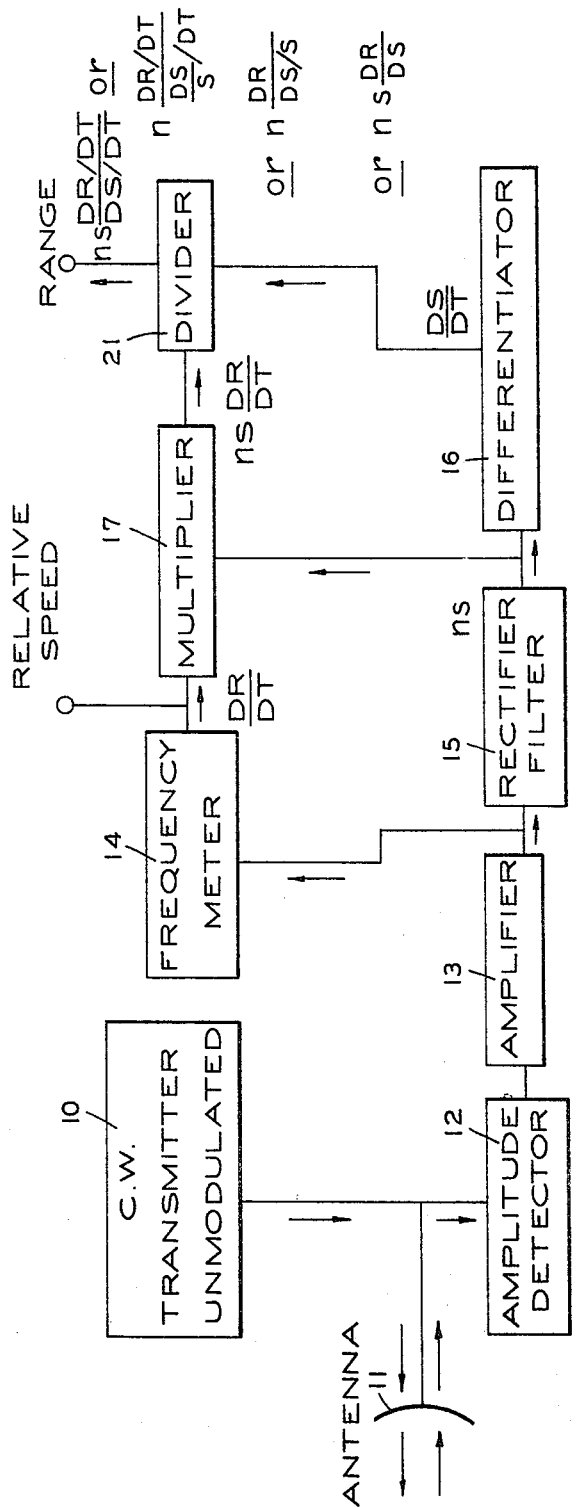

3,264,643
CONTINUOUS WAVE RADAR SYSTEM
Ole K. Nilssen, Livonia, Mich., assignor to Ford Motor Company, Dearborn, Mich., a corporation of Delaware
Filed Dec. 1, 1964, Ser. No. 415,138
11 Claims. (Cl. 343—9)

This invention relates to a continuous wave radar system and more particularly to a continuous wave radar system capable of measuring a wide gamut of ranges and requiring an absolute minimum of bandwidth and radiated power.

The present invention is based upon the principle that the strength of a signal reflected from a target varies according to an inverse power of range, and may be stated mathematically by the following equation:

$$S = C \cdot R^{-n}$$

Where S is the strength or magnitude of the reflected signal, R is range, C is a constant depending upon the strength of the transmitted signal, the directivity and efficiency of the transmitting and receiving antenna, the wave length of the radiated signal and the radar cross section of the target, and $n$ is a constant the exact value of which depends upon certain conditions such as atmospheric absorption which in turn depends upon the carrier frequency of the radar system. If S is given in terms of power, $n$ will ordinarily be 4, but if given in terms of voltage will ordinarily be equal to 2. Thus, for a given target the only variables are S and R. From this the inventor has recognized that range to a target may be determined by the relationship between the absolute change in range and the relative change in the strength of the signal reflected from the target, or the relationship between the time rate of change of range to the relative time rate of change of the strength of the signal reflected from the target. The inventor has also recognized that these relationships can be expressed in other forms, i.e., range may be determined by a ratio of the time rate of change of range to the time rate of change of the strength of the signal reflected from the target when multiplied by the magnitude or strength of this signal. The mathematical development of these relationships is given below:

$$S = C \cdot R^{-n}$$
$$dS = n \cdot C \cdot R^{(n+1)} dR$$
$$\frac{dS}{S} = n \frac{dR}{R} \text{ or}$$
$$R = n \cdot S \frac{dR}{dS} \text{ or}$$
$$R = n \cdot \frac{dR}{\frac{dS}{S}} \text{ or}$$
$$R = n \cdot \frac{S dR/dt}{dS/dt} \text{ or}$$
$$R = n \cdot \frac{dR/dt}{\frac{dS}{S}/dt}$$

The inventor has invented an uncomplicated and inexpensive continuous wave radar system to establish range by means of the relationships given above. A representative continuous wave radar system for establishing these relationships employs a continuous wave transmitting means to radiate a continuous wave, preferably unmodulated, toward a target. The reflected signal or echo signal from the target is applied to a detector means. The output from this detector means is an alternating voltage, the amplitude of which is a direct measure of the strength of the reflected or echo signal and the frequency of which is a direct measure of the change in range or range rate, $dR/dt$. It can be appreciated, therefore, that $dS/dt$ can be obtained by a time differentiation of the strength or magnitude of this signal. Since S, $dR/dt$ and $dS/dt$ are now known and $n$ is a given constant, the values can be combined in a system that will compute or produce a signal representative of range in accordance with the relationships discussed above.

An object of the present invention is the provision of an uncomplicated radar system for determining distance and relative speed between a reference point and a moving target preferably by means of an unmodulated, radiated periodic signal.

Another purpose of the invention is the provision of a radar system that is uncomplicated and is capable of measuring a complete gamut of ranges.

A further object of the invention is the provision of a radar system capable of measuring a broad gamut of ranges that requires an absolute minimum of bandwidth and radiated power.

Still another object of the invention is the provision of a radar system where all the amplification and information processing takes place at very low frequencies, thus eliminating the need for high frequency and wide bandwidth amplifiers and circuits.

Other objects and attendant advantages of the present invention may be more readily realized when the specification is considered in connection with the attached drawing in which the single figure is a block diagram of the radar system of the present invention.

Referring now to the drawing, there is shown a continuous wave transmitter 10 preferably producing a continuous wave signal which is unmodulated. This continuous wave transmitter includes or is coupled to an antenna 11 for transmitting or radiating the continuous wave signal toward a target. The reflected or echo signal from the target is received by the antenna 11 and transmitted to a detector means in the form of an amplitude detector 12. This amplitude detector 12 also receives, as shown on the block diagram, a highly attenuated portion of the signal produced by the continuous wave transmitter 10. The echo or reflected signal from the antenna 11 and the highly attenuated signal from the continuous wave transmitter 10 are combined in the detector means or amplitude detector 12.

It can be readily appreciated by those skilled in the art that the output from the detector means or amplitude detector 12 is the Doppler signal which has a frequency that is a direct measure of range rate or $dR/dt$. The amplitude or strength of this signal is a direct measure of the strength of the reflected signal or a direct measure of the quantity S given in the above equations.

The output from the detector means or amplitude detector 12 (the Doppler signal) may be applied to an amplifier 13 for amplifying the Doppler signal. A frequency meter 14 is connected to the amplifier 13 for producing a signal that is representative of the frequency of the Doppler signal or $dR/dt$. This frequency meter 14 preferably produces a unidirectional output voltage which has a direct and linear relation to the input frequency or $dR/dt$. The output of the frequency meter 14, therefore, is a direct indication of the relative speed between the system and the target, or range rate.

A rectifier and filter component 15 is also connected to the amplifier 13. This rectifier and filter component 15 provides a unidirectional voltage which is a direct representation of the strength of the echo or reflected signal, or the value S given in the above equations. By way of further explanation, this rectifier and filter component 15 may be any suitable means for producing a linear measure of the amplitude of the output from the amplifier 13.

Although it is preferred to use a peak rectifier here to determine peak amplitudes, it is also possible to use a device that will give an output representative of the average or R.M.S. value of the signal from the amplifier 13.

The output from the rectifier and filter 15 which is a direct representation of the strength of the reflected or echo signal, or $nS$, is applied to a time differentiator 16 of a standard type which differentiates the strength of the reflected or echo signal with respect to time to give an output which is representative of $dS/dt$. It can be appreciated that when the target is approaching the system that $dS/dt$ will be positive but that when the target is receding from the system that $dS/dt$ will become negative.

The output from the frequency meter 14 which is a direct representation of range rate, or $dR/dt$, and the output of the rectifier and filter component 15 which is a representation of the strength of the reflected or echo signal, or $S$, are applied to a conventional multiplier 17 thereby giving an output signal that is representative of $$nS\frac{dR}{dt}$$

The output from the differentiator 16 and the multiplier 17 are applied to a conventional divider 21 to provide at the output the quantity $$nS\frac{dR/dS}{dt/dt}$$

Or as brought out above that this quantity is the same as and may be rearranged to give $$\frac{ndR/dt}{\frac{dS/dt}{S}} \text{ or } \frac{dr}{\frac{dS}{S}} \text{ or } \frac{SdR}{dS}$$

It can be appreciated, therefore, from the mathematical development and equations previously given that the output signal from the divider is directly representative of the range to the target.

It can be appreciated that in order to measure range with the radar system disclosed, there must be a change in range or relative speed between the system and the target since it depends for its operation upon detection of the Doppler signal. As a result, it may be desirable to place in the circuit after the divider 21 a memory unit which will store range information at any time that range becomes constant for a given period. Thus, the range information may be maintained so that it is readily available to an observer or operator.

It has been assumed throughout the development of the equations and description of the invention that $n$ in the equations is a known constant. This is a valid assumption for a majority of conceivable cases and may be easily taken into account or placed in some way in the divider 21 so that the output from the divider 21 is a voltage, the absolute magnitude of which is in direct proportion to the range to the target.

It can be readily appreciated also that since the only signal acted upon by the components of the system is the Doppler signal which has a low frequency compared to the transmitted signal that the components including the amplifier 13, the rectifier and filter 15, the frequency meter 14 and the remainder of the components need only amplify and process information having very low frequencies. This eliminates the need for high frequency and wide bandwidth amplifiers and circuits found in many continuous wave radar systems.

The present invention thus provides a simple, reliable continuous wave radar system that is capable of measuring range over a wide gamut with an absolute minimum of bandwidth and radiated power.

It is to be understood that this invention is not to be limited to the exact construction shown and described, but that various changes and modifications may be made without departing from the spirit and scope of the invention as defined in the appended claims.

I claim:
1. A radar system for measuring range between the system and a target having relative velocity with respect to the system comprising, an unmodulated continuous wave transmiting means, antenna means coupled to said transmitting means for radiating the unmodulated signal toward the target, means positioned to receive the signal reflected from the target, detector means coupled to said last mentioned means and said transmitting means for detecting the Doppler signal, first means coupled to said detector means for producing a voltage having a magnitude representative of the frequency of the Doppler signal, second means coupled to said detector means for producing a unidirectional voltage representative of the strength of the Doppler signal, means coupled to said last mentioned means for taking the time derivative of said unidirectional voltage, means coupled to said first means coupled to said detector means and said means for producing the unidirectional voltage representative of the strength of the Doppler signal for producing a signal that is the product of the magnitude of the voltage developed by said first means connected to said detector means and the unidirectional voltage, and means coupled to said last mentioned means and said means for taking the time derivative of the unidirectional voltage for dividing the product of the magnitude of the voltage developed by said first means connected to said detector means and said unidirectional voltage by the time derivative of said unidirectional voltage thereby producing a signal representative of range.

2. A radar system for measuring range between the system and a target having relative velocity with respect to the system comprising, an unmodulated continuous wave transmitting means, antenna means coupled to said transmitting means for radiating the unmodulated signal toward a target, means for receiving an echo signal from said target, detector means coupled to said last mentioned means and to said transmitting means, and means coupled to said detector means for producing a signal representative of range from the system to the target, said means including means for producing a unidirectional signal from the detector representative of the strength of the received signal, means coupled to said detector means for producing a signal having a magnitude representative of the frequency of the signal from the detector means for computing the time derivative of said unidirectional signal, and for taking the ratio of the product of the magnitude of the signal representative of the frequency of the signal from the detector means and the unidirectional signal to the time derivative of said unidirectional signal.

3. A radar system for measuring range between a system and a target having relative velocity with respect to the system comprising, an unmodulated continuous wave transmitting means for transmitting a signal to the target, means for receiving an echo signal from the target, detector means coupled to said last mentioned means and to said transmitting means, rectifier and filter means coupled to said detector means for producing a signal representative of the magnitude of the output signal of said detector means, a time differentiator coupled to said rectifier and filter means, a frequency meter coupled to the output of said detector means, multiplier means coupled to the output of said frequency meter and said rectifier and filter means for producing a signal that is the product of the output signals from said frequency meter and said rectifier and filter means, and divider means coupled to the output of said time differentiator and said multiplier means for dividing the output of said multiplier means by the output from said differentiator means whereby a signal representative of the range between the system and the target is produced.

4. A radar system for measuring range between a system and a target in which the range is not a constant comprising, an unmodulated continuous wave transmitting means for radiating the unmodulated continuous wave signal toward the target, means for receiving the signal reflected from the target, an amplitude detector coupled to said last mentioned means and said transmitting means, a rectifier and filter coupled to said amplitude detector, a frequency meter coupled to said amplitude detector, a time differentiator coupled to said rectifier and filter, a multiplier coupled to the output of said frequency meter and the output of said rectifier and filter, and divider means coupled to said multiplier and said time differentiator for dividing the output of said multiplier by the output of said time differentiator thereby producing a signal representative of range between the system and the target.

5. A radar system for measuring range between a system and a target in which the range is not a constant comprising, a continuous wave transmitting means for radiating a continuous wave signal toward the target, means for receiving the signal reflected from the target, detector means coupled to said last mentioned means and said transmitting means, and means coupled to said detector means for determining the product of the strength of the Doppler signal having a magnitude and the ratio of a signal representative of the frequency of the Doppler signal to the time differential of the strength of the Doppler signal.

6. A radar system for measuring range between the system and a target in which the range is not a constant comprising, a continuous wave transmiting means for radiating a continuous wave signal toward the target, means for receiving the signal reflected from the target, detector means coupled to said last mentioned means and said transmitting means, and means coupled to said detector means for producing a signal representative of the range between the system and the target by determining the product of the strength of the output signal having a magnitude from said detector means to the ratio of a signal representative of the frequency of the signal from said detector means and the time differential of strength of the signal from said detector means.

7. A radar system for measuring range between the system and a target in which range is not constant comprising, a continuous wave transmitting means for radiating a continuous wave signal toward the target, means for receiving the signal reflected from the target, detector means coupled to said last mentioned means for detecting the Doppler signal, means coupled to said detector means for producing a signal having a magnitude representative of the frequency of said Doppler signal, means coupled to said detector means for producing a signal representative of the strength of said Doppler signal and a signal representative of the time rate of change of the strength of said Doppler signal, and means coupled to said last mentioned means and said penultimate mentioned means for producing a signal representative of the product of the signal representative of the strength of the Doppler signal and the ratio of the signal representative of the frequency of the Doppler signal to the signal representative of the time rate of change of the strength of said Doppler signal.

8. A radar system for measuring range between a system and a target in which range is not a constant comprising, a continuous wave transmitting means for radiating a continuous wave signal toward the target, means for receiving the signal reflected from the target, and means coupled to said last mentioned means for determining the ratio of the absolute change of range to the relative change in the strength of the signal reflected from the target.

9. A radar system for measuring range between a system and a target in which range is not a constant comprising, a continuous wave transmitting means for radiating a continuous wave signal toward the target, means for receiving the signal reflected from the target, and means coupled to said last mentioned means for determining the ratio of the time rate of change of range to the relative time rate of change of the strength of the signal reflected from the target.

10. A radar system for measuring range between a system and a target in which range is not a constant comprising, a continuous wave transmitting means for radiating a continuous wave signal toward the target, means for receiving the signal reflected from the target, and means coupled to said last mentioned means for producing a signal representative of the relationship between the absolute change in range between the system and the target and the relative change in the strength of the signal reflected from the target, said last mentioned signal being directly proportional to the range between the system and the target.

11. A radar system for measuring range between a system and a target in which range is not a constant comprising, a continuous wave transmitting means for radiating a continuous wave signal toward the target, means for receiving the signal reflected from the target, and means coupled to said last mentioned means for producing a signal representative of the relationship of the time rate of change of range to the relative time rate of change of the magnitude of the signal reflected from the target, said last mentioned signal being directly proportional to the range between the system and the target.

No references cited.

CHESTER L. JUSTUS, *Primary Examiner.*

R. D. BENNETT, *Assistant Examiner.*